(12) United States Patent
Sakuma et al.

(10) Patent No.: US 11,446,631 B2
(45) Date of Patent: Sep. 20, 2022

(54) ALKALINE EARTH METAL ION ADSORBENT, AND PRODUCTION METHOD OF THE SAME, AND ALKALINE EARTH METAL ION-CONTAINING LIQUID TREATMENT APPARATUS

(71) Applicants: EBARA CORPORATION, Tokyo (JP); TITAN KOGYO KABUSHIKI KAISHA, Yamaguchi (JP)

(72) Inventors: Takashi Sakuma, Tokyo (JP); Makoto Komatsu, Tokyo (JP); Takeshi Izumi, Tokyo (JP); Takayasu Tanaka, Yamaguchi (JP); Takafumi Tanaka, Yamaguchi (JP); Hidenori Ishioka, Yamaguchi (JP); Ayaka Ando, Yamaguchi (JP); Tomoko Yoshimi, Yamaguchi (JP); Nobuyuki Hashimoto, Yamaguchi (JP); Hiroaki Uchida, Yamaguchi (JP); Shigeru Nagaoka, Yamaguchi (JP)

(73) Assignee: TITAN KOGYO KABUSHIKI KAISHA, Yamaguchi (JP)

( * ) Notice: Subject to any disclaimer, the term of this patent is extended or adjusted under 35 U.S.C. 154(b) by 488 days.

(21) Appl. No.: 16/490,304

(22) PCT Filed: Mar. 1, 2018

(86) PCT No.: PCT/JP2018/007735
§ 371 (c)(1),
(2) Date: Aug. 30, 2019

(87) PCT Pub. No.: WO2018/163954
PCT Pub. Date: Sep. 13, 2018

(65) Prior Publication Data
US 2020/0016570 A1    Jan. 16, 2020

(30) Foreign Application Priority Data

Mar. 8, 2017    (JP) ............................. JP2017-043598

(51) Int. Cl.
| | | |
|---|---|---|
| *B01J 20/06* | (2006.01) | |
| *B01J 20/28* | (2006.01) | |
| *B01J 20/30* | (2006.01) | |
| *G21F 9/12* | (2006.01) | |
| *B01J 20/04* | (2006.01) | |

(52) U.S. Cl.
CPC ............ *B01J 20/06* (2013.01); *B01J 20/04* (2013.01); *B01J 20/28004* (2013.01); *B01J 20/28016* (2013.01); *B01J 20/3021* (2013.01); *B01J 20/3028* (2013.01); *B01J 20/3078* (2013.01); *B01J 20/3085* (2013.01); *G21F 9/12* (2013.01)

(58) Field of Classification Search
CPC .... B01J 20/3085; B01J 39/10; B01J 20/3021; B01J 20/06; B01J 20/3028; B01J 20/3092; B01J 20/28004; B01J 20/3078; B01J 20/041; C02F 1/281; C02F 2103/08; C02F 2209/40; C02F 2101/006; G21F 9/12; C01P 2002/72; C01P 2004/60; C01P 2004/50; C01P 2006/12; C01G 23/005

See application file for complete search history.

(56) References Cited

U.S. PATENT DOCUMENTS 6,335,096 B1    1/2002    Konnai
2015/0306594 A1    10/2015    Mori et al.

FOREIGN PATENT DOCUMENTS

| EP | 0 956 159 B1 | 3/2003 | |
|---|---|---|---|
| JP | S61-256922 A | 11/1986 | |
| JP | S63-218512 A | 9/1988 | |
| JP | H01-258737 A | 10/1989 | |
| JP | H06-183735 A | 7/1994 | |
| JP | 2000-256013 A | 9/2000 | |
| JP | 4428541 B2 | 3/2010 | |
| JP | 2013-241312 A | 12/2013 | |
| JP | 2013-246145 A | 12/2013 | |
| JP | 2015-188798 A | 11/2015 | |
| JP | 2016-190192 A | 11/2016 | |
| WO | 2013-176956 A2 | 11/2013 | |
| WO | WO-2019093008 A1 * | 5/2019 | ............ B01J 20/06 |

OTHER PUBLICATIONS

English machine translation of WO2019093008 (Year: 2019).*
International Search Report Issued in Patent Application No. PCT/JP2018/007735 dated May 15, 2018.
Written Opinion Issued in Patent Application No. PCT/JP2018/007735 dated May 15, 2018.
Yoshinori Fujiki et al., "Hydration and Derivatives of Potassium Dititanate Fibers", Yogyo-Kyokai-shi, 1982, pp. 27-31, vol. 90, No. 1037. (English Abstract).
Chinese Office Action issued in Chinese Patent Application No. 201880016555.1 dated Feb. 17, 2022.

* cited by examiner

*Primary Examiner* — Timothy C Vanoy (74) *Attorney, Agent, or Firm* — Pearne & Gordon LLP (57) ABSTRACT

Provided is a particulate alkaline earth metal ion adsorbent having a large adsorption capacity. The particulate alkaline earth metal ion adsorbent comprising: a potassium hydrogen dititanate hydrate represented by a chemical formula $K_{2-x}H_xO \cdot 2TiO_2 \cdot nH_2O$, wherein x is 0.5 or more and 1.3 or less, and n is greater than 0; and no binder, wherein the particulate alkaline earth metal ion adsorbent has a particle size range of 150 μm or more and 1000 μm or less.

11 Claims, 2 Drawing Sheets

ALKALINE EARTH METAL ION ADSORBENT, AND PRODUCTION METHOD OF THE SAME, AND ALKALINE EARTH METAL ION-CONTAINING LIQUID TREATMENT APPARATUS

TECHNICAL FIELD

The present invention relates to an adsorbent for an alkaline earth metal ion such as calcium, strontium, barium, and radium, and a production method of the same, and an alkaline earth metal ion-containing liquid treatment apparatus.

BACKGROUND ART

Strontium-90 ($^{90}$Sr), which is a radioactive alkaline earth metal isotope, is a fission product having a long half-life, easy solubility in water, and high diffusion velocity into an environment, similar to cesium-137 ($^{137}$Cs), which is a radioactive alkali metal isotope. The development of a purification treatment technology of the water contaminated with strontium-90 also has become a challenge. In particular, it is desired to develop an adsorbent and a removal technology, that enables selective adsorption removal of strontium-90 from radioactive effluents containing salts like a contaminated product of seawater in high concentration.

As an example of the removal technology of an alkaline earth metal ion, alkali metal titanates are used. One of the alkali metal titanates, potassium titanate, such as potassium tetratitanate has a layer structure in which $TiO_5$ trigonal bipyramids are chaining, and this is a layer structure in which a potassium ion ($K^+$) is arranged between layers consisting of $TiO_5$ trigonal bipyramids. The potassium ion ($K^+$) arranged between these layers may be easily hydrated or subjected to cation exchange. For example, potassium dititanate represented by a chemical formula $K_2O \cdot 2TiO_2$ is hydrated to be a potassium dititanate hydrate represented by a chemical formula $K_2O \cdot 2TiO_2 \cdot nH_2O$, and is also subjected to cation exchange between the potassium ion ($K^+$) and a proton ($H^+$) to be a potassium hydrogen dititanate hydrate represented by a chemical formula $K_{2-x}H_xO \cdot 2TiO_2 \cdot nH_2O$. In hydration, a water molecule ($H_2O$) is induced by the potassium ion ($K^+$) and may enter as a guest between layers consisting of $TiO_5$ trigonal bipyramids. In addition, in a cation exchange reaction between the potassium ion ($K^+$) and the proton ($H^+$), a hydronium ($H_3O^+$) which is a hydrated proton ($H^+$) may enter as a guest between layers consisting of $TiO_5$ trigonal bipyramids. When the $H_2O$ molecule or the hydronium ($H_3O^+$) enters, the distance between layers consisting of $TiO_5$ trigonal bipyramids expands, but the crystal structure consisting of $TiO_5$ trigonal bipyramids is generally maintained. In addition, when any other cation is present in a water system, potassium dititanate and potassium tetratitanate serve as a cation adsorbent due to the cation exchange reaction with the potassium ion ($K^+$) or the proton ($H^+$). However, when the expanded state of the distance between layers consisting of $TiO_5$ trigonal bipyramids continues, cleavage is likely to occur, and when a large shear stress is applied, the layer structure that is the crystal structure may collapse, and thus, potassium dititanate is required to be avoided. On the other hand, potassium tetratitanate represented by a chemical formula $K_2O \cdot 4TiO_2$ easily cause crystal growth in a production reaction such as a calcination reaction and a hydrothermal reaction and the product becomes a needle crystal. When potassium tetratitanate is used in a shape of the needle crystal as an adsorbent, the cation exchange reaction requires time, and adsorption efficiency becomes poor. When potassium tetratitanate is milled to enhance an adsorption performance, the cleavage is caused and thus, it is not preferred as a cation adsorbent.

Suggested are a sodium titanate ion exchanger having 0.6 or less of sodium/titanium mole ratio, 50,000 or more of selection coefficient substituting Na to Sr, 4.5 m equivalent/g or more of ion exchange capacity, and 40,000 ml/g or more of partition coefficient of a radioactive strontium measured in a 2.0 M-NaCl aqueous solution having a pH 11, and consisting of granulated particles having a particle size of 0.1 to 2 mm, and a method for producing a titanate ion exchanger containing an exchangeable cation, comprising: (1) making a slurry containing solid hydrated titanium oxide, an alkaline agent, and a liquid for slurrying, wherein the concentration of the exchangeable cation is 3.5 mole or more per liter of slurry, and the concentration of titanium per liter of slurry is 1.5 mole or more; (2) reacting the alkaline agent with titanium oxide in the above slurry at a temperature of 30 to 150° C. for 1 minute to 48 hours to produce a titanate product; (3) precipitating a solid fraction containing the titanate product; (4) filtering the solid fraction to separate a titanate filter cake; (5) washing the filter cake to remove alkali, followed by drying the washed filter cake to have a constant weight, milling the dried cake to produce various sizes of granulated particles, selecting the granulated particles having a particle size of 0.1 to 2 mm, rinsing the granulated particles having this particle size, removing at least some of all the solid fine powders, and collecting a particulate titanate product (PTL 1). However, the granular sodium titanate produced by this method has a low mole ratio of a sodium ion which is an exchange cation, to titanium, and thus has a disadvantage of low cation adsorption capacity. In addition, the granular sodium titanate produced by this method has a low strength because of being an aggregate of primary particles, is milled to be a fine powder by shaking, impacts, or the like that is applied during transport, filling into a column, or the like, and further, the aggregate is collapsed and primary particles are dropped when charging into water. Consequently, this granular sodium titanate has disadvantages that these particles in a state of fine powder, or primary particles block a filter of the adsorption column and prevent the smooth treatment of contaminated water, or adversely pass through the filter of the adsorption column and the fine powder containing strontium-90 which is a radioactive alkaline earth metal isotope leaks from the adsorption column and respreads into the environment.

Suggested is an adsorbent for radioactive strontium in water consisting of a molded product represented by a chemical formula $K_2Ti_2O_5$ that has a particle size of 150 to 3000 μm and produced by adding a binder to a titanate powder having an average particle size of 1 to 150 μm and having a shape with a plurality of protrusion extending in random directions for molding, followed by calcining; improving mechanical strength; and capable of inhibiting dropping of primary particles (PTL 2). However, use of the binder causes the adsorbent to contain a substance not contributing to adsorption of strontium-90, and cation exchange capacity as the adsorbent is reduced as compared with the original cation exchange capacity of titanate. In addition, calcining for obtaining the strength of the adsorbent increases the energy cost of production.

Supplying an alkaline earth metal ion adsorbent having a larger cation adsorption capacity and excellent mechanical strength, generating no fine powder, and having excellent handling property as a treatment agent of radioactive strontium contaminated water with low cost is desired.

CITATION LIST

Patent Literature

PTL 1: Japanese Patent Publication No. 4428541B
PTL 2: Japanese Patent Publication No. 2013-246145A

SUMMARY OF INVENTION

Technical Problem

It is an object of the present invention to provide an alkaline earth metal ion adsorbent having a large adsorption capacity of an alkaline earth metal ion, particularly of a strontium ion. It is also an object of the present invention to provide the alkaline earth metal ion adsorbent and a production method of the same, having a large cation exchange capacity and excellent mechanical strength, generating no fine powder, having excellent handling property, and being suitable for decontamination of a radioactive alkaline earth metal ion-containing liquid (in particular, radioactive strontium contaminated water), by using the alkaline earth metal ion adsorbent without compromising the original adsorption property of the adsorbent itself. It is also an object of the present invention to provide a radioactive alkaline earth metal ion-containing liquid treatment apparatus filled with this alkaline earth metal ion adsorbent.

Solution to Problem

The inventors have conducted intensive studies to solve the above problems and have found that when the composition is converted to a potassium hydrogen dititanate hydrate represented by a chemical formula $K_{2-x}H_xO \cdot 2TiO_2 \cdot nH_2O$ by hydration of a potassium dititanate represented by a chemical formula $K_2O \cdot 2TiO_2$ and by cation exchange reaction between a potassium ion ($K^+$) and a proton ($H^+$), structure conversion is caused at the same time, and this structure conversion increases cation exchange capacity with an alkaline earth metal ion. In particular, the inventors have found that the potassium hydrogen dititanate hydrate represented by a chemical formula $K_{2-x}H_xO \cdot 2TiO_2 \cdot nH_2O$, in which x falls within a range of 0.5 or more and 1.3 or less, has an excellent adsorption performance of the alkaline earth metal ion. The inventors have further found that granulating the potassium hydrogen dititanate hydrate without using a binder enables to obtain a particulate alkaline earth metal ion adsorbent which generates small amount of fine powder and has excellent handling property while maintaining original cation adsorption capacity of the potassium hydrogen dititanate hydrate, and thereby completed the present invention.

Specific aspects of the present invention are as follows.
[1] A particulate alkaline earth metal ion adsorbent comprising:
 a potassium hydrogen dititanate hydrate represented by a chemical formula $K_{2-x}H_xO \cdot 2TiO_2 \cdot nH_2O$, wherein x is 0.5 or more and 1.3 or less, and n is greater than 0; and
  no binder, wherein
  the particulate alkaline earth metal ion adsorbent has a particle size range of 150 μm or more and 1000 μm or less.
[2] The particulate alkaline earth metal ion adsorbent according to [1], wherein in X-ray diffraction using a CuKα ray as an X-ray source, X-ray diffraction peak is within a range of 2θ of 8.5±2.0°.

[3] The particulate alkaline earth metal ion adsorbent according to [1] or [2], wherein the particulate alkaline earth metal ion adsorbent exhibits a strontium adsorption performance having a B.V. of 3000 or more at breakthrough at which a percentage of a strontium concentration in water at an inlet ($C_0$) based on a strontium concentration in water at an outlet (C) is greater than 5%,
 when the particulate alkaline earth metal ion adsorbent is filled to a height of 10 cm in a cylindrical column having an inner diameter of 15.96 mm; and
 a simulated contaminated seawater comprising 0.3% of an ordinary salt, 5 ppm of strontium, 5 ppm of magnesium, and 1 ppm of cesium is flowed at a flow rate of 6.5 ml/min (a water-flow linear flow velocity of 2 m/h and a space velocity of 20 $h^{-1}$).
[4] A production method of the particulate alkaline earth metal ion adsorbent according to any one of [1] to [3], comprising:
 hydrating potassium dititanate represented by a chemical formula $K_2O \cdot 2TiO_2$,
 subjecting to cation exchange between a potassium ion ($K^+$) and a proton ($H^+$) to obtain a potassium hydrogen dititanate hydrate represented by a chemical formula $K_{2-x}H_xO \cdot 2TiO_2 \cdot nH_2O$, wherein x is 0.5 or more and 1.3 or less, and n is greater than 0, and
 granulating the hydrate without using a binder.
[5] The production method according to [4], comprising the steps of:
 (1) mixing a titanium source and a potassium source;
 (2) calcining the resulting mixture to obtain potassium dititanate;
 (3) contacting potassium dititanate with water for hydration and cation exchange between the potassium ion and the proton to obtain a potassium hydrogen dititanate hydrate, $K_{2-x}H_xO \cdot 2TiO_2 \cdot nH_2O$, wherein x is 0.5 or more and 1.3 or less and n is greater than 0;
 (4) wet milling the resulting potassium hydrogen dititanate hydrate, $K_{2-x}H_xO \cdot 2TiO_2 \cdot nH_2O$, wherein x is 0.5 or more and 1.3 or less, in a slurry;
 (5) subjecting a filter cake containing the potassium hydrogen dititanate hydrate to solid-liquid separation from the slurry;
 (6) granulating the filter cake into a particle of the potassium hydrogen dititanate hydrate without using the binder;
 (7) drying the potassium hydrogen dititanate hydrate at a temperature of 60° C. or more and 150° C. or less for 1 hour or more and 24 hours or less; and
 (8) disintegrating and sizing the dried potassium hydrogen dititanate hydrate to provide the particulate alkaline earth metal ion adsorbent having a particle size range of 150 μm or more and 1000 μm or less.
[6] An alkaline earth metal ion-containing liquid treatment apparatus filled with the particulate alkaline earth metal ion adsorbent according to any one of [1] to [3].
[7] A radioactive strontium decontamination apparatus filled with the particulate alkaline earth metal ion adsorbent according to any one of [1] to [3].
[8] An alkaline earth metal ion-containing liquid treatment method, the method comprising using the particulate alkaline earth metal ion adsorbent according to any one of [1] to [3].
[9] A radioactive strontium decontamination method, the method comprising using the particulate alkaline earth metal ion adsorbent according to any one of [1] to [3].
[10] An alkaline earth metal ion-containing liquid treatment method comprising flowing an alkaline earth metal ion-containing liquid into an alkaline earth metal ion-containing liquid treatment apparatus filled with the particulate alkaline earth metal ion adsorbent according to any one of [1] to [3] at a water-flow linear flow velocity (LV) of 1 m/h or more and 40 m/h or less and a space velocity (SV) of 5 $h^{-1}$ or more and 40 $h^{-1}$ or less.

[11] A radioactive strontium decontamination method comprising flowing a radioactive strontium-containing liquid into a radioactive strontium decontamination apparatus filled with the particulate alkaline earth metal ion adsorbent according to any one of [1] to [3] at a water-flow linear flow velocity (LV) of 1 m/h or more and 40 m/h or less and a space velocity (SV) of 5 $h^{-1}$ or more and 40 $h^{-1}$ or less.

Advantageous Effects of Invention

According to the present invention, use of the potassium hydrogen dititanate hydrate represented by a chemical formula $K_{2-x}H_xO \cdot 2TiO_2 \cdot nH_2O$ enables to improve the adsorption capacity of the alkaline earth metal ion than other alkali metal titanates. In addition, the particulate alkaline earth metal ion adsorbent having high mechanical strength and excellent adsorption performance without using a binder can be produced.

DESCRIPTION OF EMBODIMENTS

Hereinafter, embodiments of the present invention will be described in detail and the embodiments described below are for facilitating the understanding and are not limited to the present invention in any way. The present invention can be conducted by variously modifying each element disclosed in the following embodiments within a scope of the claimed invention.

An alkaline earth metal ion adsorbent of the present invention is characterized by containing a potassium hydrogen dititanate hydrate represented by a chemical formula: $K_{2-x}H_xO \cdot 2TiO_2 \cdot nH_2O$, wherein x is 0.5 or more and 1.3 or less, and n is greater than 0, and no binder. When x is greater than 1.3, cleavage of layers consisting of $TiO_5$ trigonal bipyramids is likely to occur, the strength is reduced in granulation, and a particulate alkaline earth metal ion adsorbent having high mechanical strength cannot be obtained. On the other hand, when x is smaller than 0.5, adsorption capacity is deteriorated. When x is 0.5 or more and 1.3 or less and the space between layers is expanded, the adsorption capacity of the alkaline earth metal ion is exhibited, and thus the state of hydration, that is, the value of n is not limited, but n is usually greater than 0 and 2 or less.

In X-ray diffraction using a Cuk$\alpha$ ray as an X-ray source, the potassium hydrogen dititanate hydrate used in the present invention has a diffraction peak within a range of 2θ, that represents an interlayer distance, of 8.5±2.0°. This peak reflects an interlayer size, and 2θ being within this range enables to exert a high alkaline earth metal ion adsorption capacity. This characteristic peak of the X-ray diffraction is generated by a step of mixing potassium dititanate: chemical formula $K_2O \cdot 2TiO_2$, with water to give a hydrate.

The alkaline earth metal ion adsorbent of the present invention is the particulate alkaline earth metal ion adsorbent containing no binder and having a particle size ranging in 150 μm or more and 1000 μm or less, preferably 150 μm or more and 600 μm or less, and further preferably 150 μm or more and 300 μm or less. The particle having a particle size in the above range can not only exert high adsorption capacity, but also has excellent mechanical strength, allows easy handling, and can easily filled into an adsorption column for removing the alkaline earth metal ion.

An alkali metal titanate is typically represented by a chemical formula $M_2O \cdot mTiO_2$ (M is an univalent cation except for $H^+$, m=1, 2, 3, 4, 6, 8 or the like). In the alkali metal titanate as a cation exchanger, the larger m becomes, the smaller the amount of cation exchange capacity becomes, because cation exchange sites per one molecule of the alkali metal titanate becomes smaller. Thus, regarding the cation exchange capacity, alkali metal monotitanate represented by the chemical formula $M_2O \cdot TiO_2$ (M is the univalent cation except for $H^+$), wherein m is 1, is ideal. However, the alkali metal monotitanate is highly unstable. For example, immediately after heating, the alkali metal monotitanate is disproportionated to alkali metal dititanate: a chemical formula $M_2O \cdot 2TiO_2$ (M is the univalent cation except for $H^+$) and an alkali oxide: a chemical formula $M_2O$. On the other hand, alkali metal dititanate wherein m is 2: the chemical formula $M_2O \cdot 2TiO_2$ (M is the univalent cation except for $H^+$) is thermally stable and has excellent chemical resistance such as an acid and alkali, and is suitable as the adsorbent for water treatment. The particulate alkaline earth metal ion adsorbent of the present invention contains as a main component, the alkali metal hydrogen dititanate hydrate: a chemical formula $M_{2-x}H_xO \cdot 2TiO_2 \cdot nH_2O$ (M is the univalent cation except for $H^+$) obtained by hydrating the alkali metal dititanate represented by the chemical formula $M_2O \cdot 2TiO_2$ (M is the univalent cation except for $H^+$) and subjecting to cation exchange between a $M^+$ ion and a proton ($H^+$), and contains no binder.

According to the present invention, also provided is an alkaline earth metal ion-containing liquid treatment apparatus, preferably a radioactive strontium decontamination apparatus, wherein the above particulate alkaline earth metal ion adsorbents are filled into an adsorption container or the adsorption column for water treatment.

According to the present invention, also provided is an alkaline earth metal ion-containing liquid treatment method, preferably a radioactive strontium decontamination method comprising flowing an alkaline earth metal ion-containing liquid, preferably a radioactive strontium-containing liquid into the alkaline earth metal ion-containing liquid treatment apparatus, preferably the radioactive strontium decontamination apparatus to adsorb and remove the alkaline earth metal ion, preferably the radioactive strontium.

The particulate alkaline earth metal ion adsorbent of the present invention can be produced by (1) mixing a titanium source and a potassium source; (2) calcining the resulting mixture to obtain potassium dititanate; (3) contacting potassium dititanate with water (slurrying) to hydrate and cation exchange between the potassium ion and the proton to obtain a potassium hydrogen dititanate hydrate, $K_{2-x}H_xO \cdot 2TiO_2 \cdot nH_2O$, wherein x is 0.5 or more and 1.3 or less; (4) wet milling the resulting potassium hydrogen dititanate hydrate, $K_{2-x}H_xO \cdot 2TiO_2 \cdot nH_2O$, wherein x is 0.5 or more and 1.3 or less, in a slurry; (5) subjecting the slurry to solid-liquid separation to obtain a filter cake containing potassium hydrogen dititanate hydrate; (6) granulating the filter cake into a particle of potassium hydrogen dititanate hydrate without using the binder; (7) drying the potassium hydrogen dititanate hydrate to have a predetermined interlayer distance; (8) disintegrating and sizing the dried potassium hydrogen dititanate hydrate to make the particulate alkaline earth metal ion adsorbent having a desired particle size range.

The potassium hydrogen dititanate hydrate represented by the chemical formula $K_{2-x}H_xO\cdot 2TiO_2\cdot nH_2O$, wherein x is 0.5 or more and 1.3 or less, can be obtained by dissolving an ilmenite by a sulfuric acid method; mixing the obtained metatitanic acid slurry with potassium sources such as potassium carbonate, potassium bicarbonate, potassium hydroxide, and potassium oxide; drying and calcining the resulting mixture; mixing the obtained potassium dititanate ($K_2O\cdot 2TiO_2$) with water for hydration; and cation exchanging between the potassium ion (K+) and the proton (H+).

The potassium hydrogen dititanate hydrate can be granulated into a large particle having high mechanical strength without using a binder.

Hereinafter, a production method of the particulate alkaline earth metal ion adsorbent of the present invention will be described for the respective steps.

[Raw Material]

As the titanium source used in the present invention, titanium dioxide, titanium suboxide, an orthotitanic acid or a salt thereof, a methatitanic acid or a salt thereof, titanium hydroxide, and the like may be used alone or in any combination thereof. The methatitanic acid may be preferably used. The methatitanic acid is obtained as a slurry by dissolving titanium ores such as ilmenite with a sulfuric acid and then subjecting to hydrolysis, and thus it is more inexpensive than a calcined product. Further, since the methatitanic acid is finer than the calcined product, the methatitanic acid has excellent mixing performance and reactivity with the potassium source.

As the potassium source, potassium carbonate, potassium hydroxide, potassium oxalate, and the like may be used alone or in any combination thereof. The potassium source is preferably one melted in calcination reaction, and a carbonate is particularly preferable. Potassium carbonate is preferable because it can melt or degrade in the calcination reaction with the titanium source and easily cause a reaction, and also because no byproduct is generated after degradation, except that chemically inactive carbon dioxide is generated.

[Mixing]

A mixing ratio of the potassium source to the titanium source is that the ratio of K relative to 1 mole of Ti is preferably 0.95 mole or more and 1.25 mole or less. When the ratio of K relative to 1 mole of Ti is smaller than 0.95 mole, the amount of impurities such as potassium tetratitanate is increased, and when the ratio of K relative to 1 mole of Ti is greater than 1.25 mole, excess potassium remains without producing potassium titanate. In both cases, the cation exchange capacity is decreased, and the adsorption capacity of the alkaline earth metal ion is decreased. The composition analyzed is a value measured with Inductively Coupled Plasma-Mass Spectrometer ICP-Mass (Agilent 7700x ICP-MS manufactured by Agilent Technologies Inc.). The mixing of the titanium source and potassium source may be carried out by dry blending, in which a solid is used for respective raw materials, or by wet blending, in which a slurry or an aqueous solution is used for one raw material or respective raw materials.

When carrying out dry blending, the obtained mixture can be calcined as it is. When carrying out wet blending, the mixed slurry of the titanium source and the potassium source is dried by any suitable method, and then calcined. In order to carrying out drying of the mixed slurry easily and effectively, the mixed slurry may be granulated before drying. As the granulation method from the slurry, a usual granulation method, such as a method of extruding a high viscous slurry from a perforated plate may be used without any limitation. The mode or heat source of a drying apparatus is not limited, and the spray drying method having a short drying time is preferable, because when the dying time is increased, water-soluble potassium is moved from the inside of a bulk to the surface of the bulk together with the movement of water, and thereby deviation from the Ti/K mole ratio is caused.

[Calcination]

Potassium dititanate is obtained by calcining the raw material mixture of the titanium source and the potassium source. The calcination temperature and calcination time are not particularly limited but are preferably held at a temperature within a range of 700° C. or more and 850° C. or less for 1 hour or more and 24 hours or less. The temperature increase rate and temperature decrease rate are not particularly limited but are usually preferably 3° C./minute or more and 8° C./minute or less.

[Disintegration and Slurrying]

To facilitate slurrying of the obtained calcined product and wet milling of the next step, the calcined product is preferably disintegrated. Disintegration may be carried out by using a usual disintegrating means, such as a mortal machine, an edge runner mill, a hammer mill, a jet mill, a high-speed disintegrator, and a two-roll mill. After the calcined product is disintegrated, water is added to the disintegrated products to slurry. Slurrying causes hydration and cation exchange between the potassium ion and the proton in potassium dititanate, and thus the potassium hydrogen dititanate hydrate represented by $K_{2-x}H_xO\cdot 2TiO_2\cdot nH_2O$, wherein x is 0.5 or more and 1.3 or less, is produced.

[Wet Milling]

The slurry obtained by the above disintegration and slurrying is wet milled. However, since the excess wet milling causes excessive progress of fine powderization and reduction in mechanical strength of the adsorbent as a final material, moderate wet milling is carried out. As the wet milling, a usual wet milling method such as a beads mill, a high-pressure homogenizer and the like may be used without any limitation. The conditions of wet milling may be appropriately selected in accordance with the property of the potassium hydrogen dititanate hydrate in a slurry or the treatment conditions after wet milling. For example, the milling condition may be set such that the potassium hydrogen dititanate hydrate dried after wet milling has a specific surface area of 1.5 $m^2/g$ or more and 15 $m^2/g$ or less.

[Filtration]

The wet milled slurry is subjected to solid-liquid separation with any suitable filtration apparatus. The filtration apparatus is not particularly limited, and a usual filtration apparatus, such as a vacuum filtration apparatus, a press filtration apparatus and the like may be used. Considering the easiness of granulation, the moisture content of the filter cake is preferably 35 wt % or more and 50 wt % or less.

[Granulation]

The filter cake obtained is granulated. As the granulation method, the filter cake may be directly extruded and granulated (wet granulation), or the filter cake may be dried and then the dried product in a mass shape may be milled and sized (dry granulation). As an extrusion granulation apparatus, a screw extrusion granulator, a roll extrusion granulator, a blade extrusion granulator, a self-mold extrusion granulator, and the like may be used.

[Drying]

A granulated body after wet granulation is dried. The drying apparatus and its heat source are not particularly limited and drying may be preferably carried out at a temperature of 60° C. or more and 150° C. or less for 1 hour or more and 24 hours or less. The interlayer distance of the product is decreased by heating. The interlayer distance affects ion-exchange capacity. Thus, temperature control is required to be carried out strictly.

[Disintegration and Sizing]

A granulated body after dry granulation or a granulated body dried after wet granulation is disintegrated, and sized by using a classification apparatus, as needed, to have a particle size of 150 mm or more and 1000 µm or less, and more preferably 150 µm or more and 600 µm or less; thereby obtaining the particulate alkaline earth metal ion adsorbent. With the particle size after sizing being within the above range, filled volume into the adsorption column and the like may be maintained within a preferable range, and a possibility of blocking the adsorption column may be reduced. A small filled volume is not preferable because it reduces the adsorption capacity of the alkaline earth metal ion based on the unit volume, and the blocking of the adsorption column is not preferable because water cannot flow.

[Alkaline Earth Metal Ion-Containing Liquid Treatment Apparatus or Radioactive Strontium Decontamination Apparatus]

The particulate alkaline earth metal ion adsorbent of the present invention can be used by filling in the adsorption container or the adsorption column that has a strainer structure at a lower part or an upper part thereof. The particulate alkaline earth metal ion adsorbent of the present invention can be effectively used in the alkaline earth metal ion-containing liquid treatment apparatus or the radioactive strontium decontamination apparatus that treats the contaminated water containing the alkaline earth metal ion, particularly containing radioactive strontium by flowing into the adsorption container or the adsorption column.

In the alkaline earth metal ion-containing liquid treatment apparatus or the radioactive strontium decontamination apparatus of the present invention, the particulate alkaline earth metal ion adsorbent of the present invention is preferably filled to a height of 10 cm or more and 300 cm or less, preferably 20 cm or more and 250 cm or less, and more preferably a height of 50 cm or more and 200 cm or less in the adsorption column. The adsorbent within the above range can uniformly fill an adsorbent layer in filling into the adsorption column, causes no short pass in water flow, and as a result, the quality of treated water can be prevented from deteriorating. The higher height is preferable because it allows to realize a suitable pressure difference of the water flow, stabilize the quality of treated water, and increase the total amount of treated water, but the height is preferably 300 cm or less to reduce the pressure difference of the water flow.

[Alkaline Earth Metal Ion-Containing Liquid Treatment Method or Radioactive Strontium Decontamination Method]

The present invention also provides the alkaline earth metal ion-containing liquid treatment method comprising flowing the alkaline earth metal ion-containing liquid or the radioactive strontium-containing liquid into the alkaline earth metal ion-containing liquid treatment apparatus or the radioactive strontium decontamination apparatus at a predetermined water-flow linear flow velocity (LV) and a space velocity (SV).

When used for the radioactive strontium decontamination, a radioactive effluent containing radioactive strontium is flowed into the adsorption column filled with the adsorbent of the present invention, at the water-flow linear flow velocity (LV) of 1 m/h or more and 40 m/h or less, preferably 2 m/h or more and 30 m/h or less, and more preferably 10 m/h or more and 20 m/h or less, and at the space velocity (SV) of 4010 or less, preferably 30 $h^{-1}$ or less, more preferably 20 $h^{-1}$ or less, preferably 5 $h^{-1}$ or more, and more preferably 10 $h^{-1}$ or more. The water-flow linear flow velocity of greater than 40 m/h increases the pressure difference of the water flow, and that of less than 1 m/h reduces the amount of treated water. At the space velocity (SV) of 20 $h^{-1}$ or less and particularly of about 10 $h^{-1}$ that is used in a typical effluent treatment, the effect of the adsorbent of the present invention can be obtained, but at the high space velocity (SV) exceeding 20 $h^{-1}$, an effluent treatment using a typical adsorbent cannot realize the stable quality of treated water and cannot obtain a removal effect. In the present invention, the water-flow linear flow velocity and the space velocity can be increased in size without upsizing the adsorption column.

The water-flow linear flow velocity is a value dividing an amount of water ($m^3$/h) flowing into the adsorption column by a cross-sectional area ($m^2$) of the adsorption column. The space velocity is a value dividing an amount of water ($m^3$/h) flowing into the adsorption column by a volume ($m^3$) of the adsorbent filled into the adsorption column.

Hereinafter, the present invention will be more specifically described based on Examples and Comparative Examples. However, Examples mentioned below are only for illustrative purposes, and the scope of the present invention is not limited by these Examples.

EXAMPLES

Synthetic Example: Synthesis of Potassium Dititanate

In a metatitanic acid slurry containing 14.75 kg of Ti in terms of titanium oxide, 15.75 kg of potassium carbonate (manufactured by Asahi Glass Co., Ltd.) was dissolved to prepare a raw material mixture slurry. The raw material mixture slurry was spray dried to obtain a mixed dry material containing a titanium source and a potassium source.

Two kg of the obtained mixed dry material was filled into 2 saggars, each containing 1 kg, and calcined in an electric furnace at a set temperature of 770° C. for 6 hours. The obtained calcined product was disintegrated with a hammer mill. The obtained powder was identified with an X-ray diffraction apparatus (RINT-TTR III manufactured by Rigaku Corporation) and it was corresponded to the peak of potassium dititanate represented by a chemical formula $K_2O \cdot 2TiO_2$. The average particle size of the powder measured by using a scanning electron microscope was 15 µm.

Example 1: Production of Particulate Alkaline Earth Metal Ion Adsorbent

To 2 L or water, 400 g of the potassium dititanate powder having an average particle size of 15 µm obtained in Synthetic Example was added (back in water again) to prepare a slurry (slurrying). This slurry was wet milled twice. After wet milling, the resultant was subjected to solid-liquid separation to obtain a dried potassium hydrogen dititanate hydrate powder and its specific surface area was 6.5 m$^2$/g.

Then, the slurry was filtrated under vacuum filtration to obtain a filter cake. The obtained filter cake was dried at a set temperature of 110° C. for 15 hours, followed by disintegrating and sizing to a particle size range of 300 μm or more and 600 μm or less by a sieve to obtain a particulate alkaline earth metal ion adsorbent in a particle size range of 300 μm or more and 600 μm or less.

Example 2: Production of Particulate Alkaline Earth Metal Ion Adsorbent

To 2 L or water, 400 g of the potassium dititanate powder having an average particle size of 15 μm obtained in Synthetic Example was added (back in water again) to prepare a slurry (slurrying). This slurry was wet milled twice. After wet milling, the resultant was subjected to solid-liquid separation to obtain a dried potassium hydrogen dititanate hydrate powder and its specific surface area was 4.7 m$^2$/g.

Then, the slurry was filtrated by using a press filtration machine to obtain a filter cake. The obtained filter cake was granulated by using an extrusion molding machine and dried at a set temperature of 110° C. for 15 hours, followed by disintegrating and sizing to a particle size range of 300 μm or more and 600 μm or less by a sieve to obtain a particulate alkaline earth metal ion adsorbent in a particle size range of 300 μm or more and 600 μm or less.

Example 3: Production of Particulate Alkaline Earth Metal Ion Adsorbent

To 2 L or water, 400 g of the potassium dititanate powder having an average particle size of 15 μm obtained in Synthetic Example was added (back in water again) to prepare a slurry (slurrying). This slurry was wet milled twice. After wet milling, the resultant was subjected to solid-liquid separation to obtain a dried potassium hydrogen dititanate hydrate powder and its specific surface area was 4.7 m$^2$/g.

Then, the slurry was filtrated by using a press filtration machine to obtain a filter cake. The obtained filter cake was granulated by using an extrusion molding machine. The obtained granulation material was sprayed with 3 wt % of water and dried at a set temperature of 110° C. for 15 hours, followed by disintegrating and sizing to a particle size range of 150 μm or more and 300 μm or less by a sieve to obtain a particulate alkaline earth metal ion adsorbent in a particle size range of 150 μm or more and 300 μm or less.

Example 4: Production of Particulate Alkaline Earth Metal Ion Adsorbent

To 2 L or water, 1200 g of the potassium dititanate powder having an average particle size of 15 μm obtained in Synthetic Example was added (back in water again) to prepare a slurry (slurrying). This slurry was wet milled twice. After wet milling, the resultant was subjected to solid-liquid separation to obtain a dried potassium hydrogen dititanate hydrate powder and its specific surface area was 9.9 m$^2$/g.

Then, the slurry was filtrated under vacuum filtration to obtain a filter cake. The obtained filter cake was dried at a set temperature of 110° C. for 15 hours, followed by disintegrating and sizing to a particle size range of 300 μm or more and 600 μm or less by a sieve to obtain a particulate alkaline earth metal ion adsorbent in a particle size range of 300 μm or more and 600 μm or less.

Example 5: Production of Particulate Alkaline Earth Metal Ion Adsorbent

To 2 L or water, 400 g of the potassium dititanate powder having an average particle size of 15 μm obtained in Synthetic Example was added (back in water again) to prepare a slurry (slurrying). This slurry was wet milled once. After wet milling, the resultant was subjected to solid-liquid separation to obtain a dried potassium hydrogen dititanate hydrate powder and its specific surface area was 3.6 m$^2$/g.

Then, the slurry was filtrated and washed by using a press filtration machine to obtain a filter cake. The obtained filter cake was granulated by using an extrusion molding machine and dried at a set temperature of 110° C. for 15 hours, followed by disintegrating and sizing to a particle size range of 150 μm or more and 600 μm or less by a sieve to obtain a particulate alkaline earth metal ion adsorbent in a particle size range of 150 μm or more and 600 μm or less.

Comparative Example 1: Production of Binder-Containing Particle

After mixing 200 g of the potassium dititanate powder having a specific surface area of 1.0 m$^2$/g and an average particle size of 15 μm obtained in Synthetic Example, 60 g of natural zeolite SP-2300 manufactured by Nitto Funka Kogyo K.K. as a binder, and 6 g of PVA (polyvinyl alcohol) as a granulation aid, tumbling granulation was conducted while gradually adding 60 g of water. The granulated material was dried at a set temperature of 110° C. for 12 hours, followed by sizing to a particle size range of 300 μm or more and 1000 μm or less by a sieve. The sized powder was calcined in an electric furnace at a set temperature of 630° C. for 5 hours. By sizing again to a particle size range of 300 μm or more and 1000 μm or less by the sieve after calcination, particles in a particle size range of 300 μm or more and 1000 μm were obtained.

Comparative Example 2: Production of Particle of Potassium Dititanate

The potassium dititanate powder having a specific surface area of 1.0 m$^2$/g and an average particle size of 15 μm obtained in Synthetic Example was disintegrated as it was. The specific surface area after disintegration was 1.3 m$^2$/g. Further, by sizing to a particle size range of 150 μm or more and 600 μm or less by a sieve, particles in a particle size range of 150 μm or more and 600 μm or less were obtained.

Comparative Example 3: Commercial Granular Adsorbent

The commercial product of granular sodium titanate disclosed in PTL 2, the trade name "SrTreat" manufactured by Fortum, was used.

[Composition Analysis]

The content of titanium and potassium in a sample was measured by Inductively Coupled Plasma-Mass Spectrometer ICP-Mass (Agilent 7700x ICP-MS manufactured by Agilent Technologies Inc.). From the content, x in a chemical formula $K_{2-x}H_xO \cdot 2TiO_2 \cdot nH_2O$ was calculated.

[X-Ray Diffraction]

By using an X-ray diffraction apparatus RINT-TTR III manufactured by Rigaku Corporation and a CuKα ray as an X-ray source, an X-ray diffraction profile of the sample was obtained at a scanning speed of 5 deg/min. When the X-ray diffraction intensity was low, the X-ray diffraction profile was obtained by conducting scanning a plurality of times and integrating them. An analysis program installed on the X-ray diffraction apparatus was used to calculate the diffraction angle 2θ of the main X-ray diffraction peak.

have no difficulty, but a few collapse of the particles are observed after the column test.

Fair: the flowing-down of the aqueous solution in the column test has no difficulty, the particles are collapsed after the column test and the removal of the particles from the column has difficulty.

Poor: the flowing-down of the aqueous solution in the column test has difficulty and the particles are so collapsed that the particles cannot be easily removed from the column.

The results are summarized in Table 1.

TABLE 1

|  | Binder | Particle Size μm | $x^{*1}$ | Main Peak 2θ deg | Breakthrough B.V. mg/g | Collapsed State$^{*2}$ |
| --- | --- | --- | --- | --- | --- | --- |
| Example 1 | Without | 300 to 600 | 1.10 | 9.4 | 4400 | Excellent |
| Example 2 | Without | 300 to 600 | 1.24 | 7.2 | 3200 | Excellent |
| Example 3 | Without | 150 to 300 | 1.02 | 10.1 | 4400 | Good |
| Example 4 | Without | 300 to 600 | 0.58 | 10.4 | 3800 | Excellent |
| Example 5 | Without | 300 to 600 | 1.24 | 9.0 | 4000 | Good |
| Comparative Example 1 | With | 300 to 1000 | 0.08 | 13.3 | 480 | Excellent |
| Comparative Example 2 | Without | 150 to 600 | 0.02 | 13.5 | Non-Measurable | Poor |
| Comparative Example 3 | With | — | — | — | 2800 | Fair |

$^{*1}$indicates x represented by the chemical formula $K_{2-x}H_xO \cdot 2TiO_2 \cdot nH_2O$.
$^{*2}$indicates collapsed state of particles after column test.

[Evaluation of Strontium Adsorption Performance]

Figure 1:
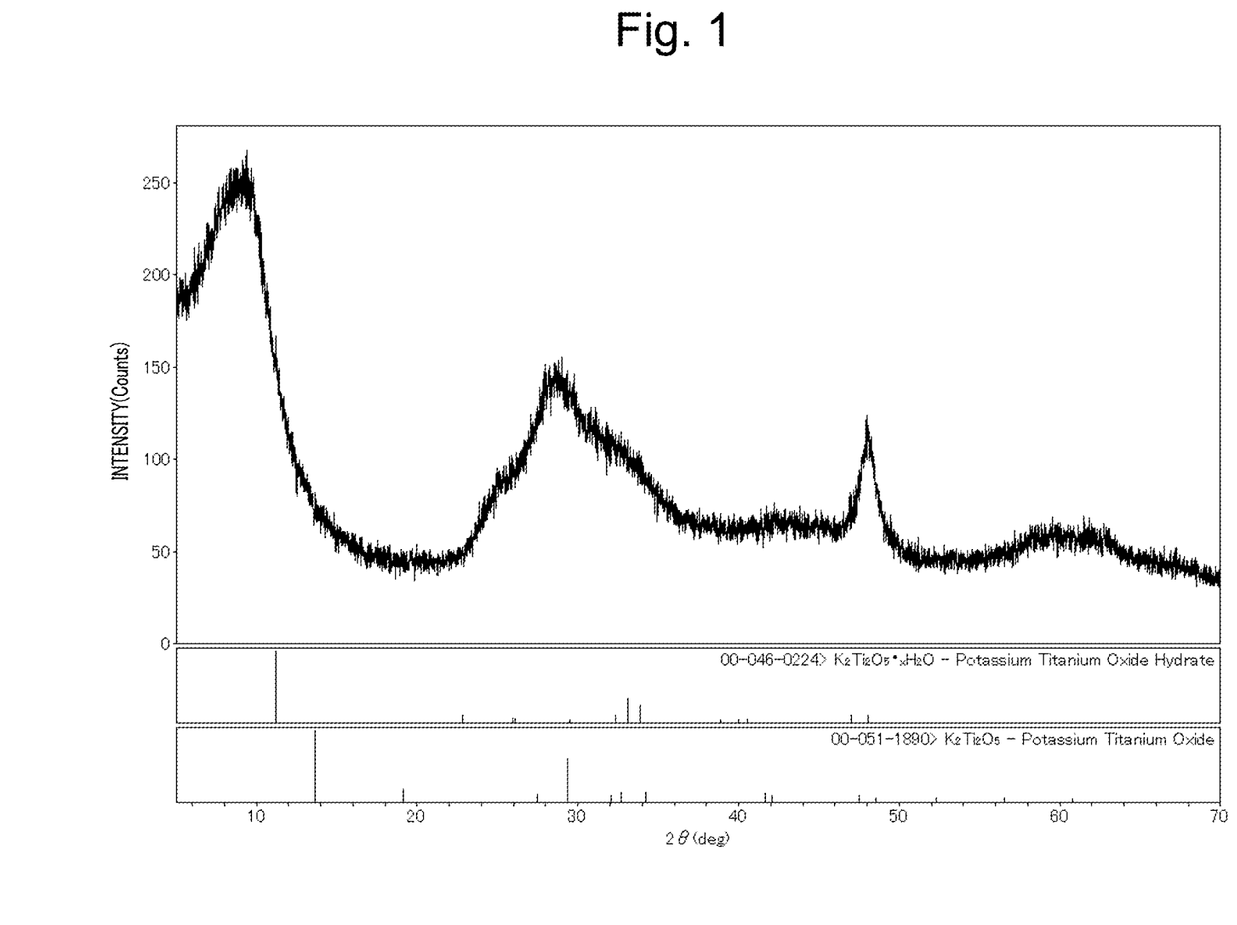
FIG. 1 is an X-ray diffraction spectrum of a potassium hydrogen dititanate hydrate obtained by Example 1.
Figure 2:
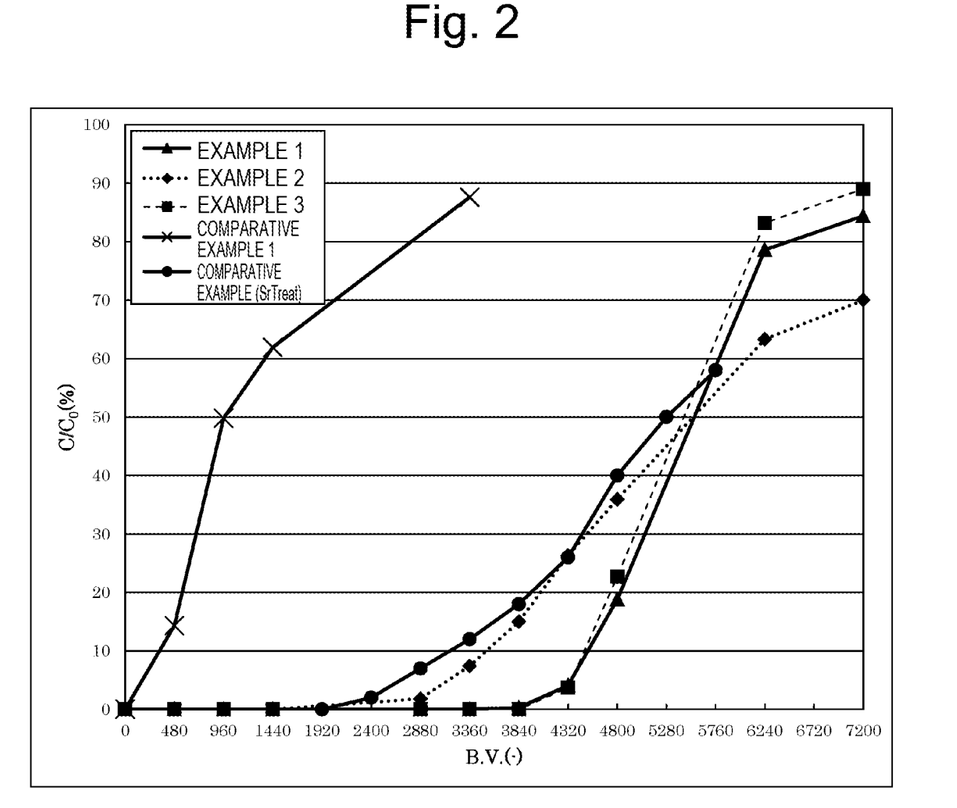
FIG. 2 is a graph illustrating strontium removal performance according to the column test of Example 1, 2, and 3 and Comparative Example 1 and 3.

Each of the particulate alkaline earth metal ion adsorbent produced in Examples 1 to 5 and Comparative Examples 1 and 2 and the commercial granular sodium titanate of Comparative Example 3 was filled to have a volume of 20 mL and a height of 100 mm in a cylindrical column having an inner diameter of 15.96 mm A simulated contaminated seawater that was prepared to have 0.3% of an ordinary salt, 5 ppm of each of strontium, 5 ppm of magnesium, and 1 ppm of cesium was flowed into each column at a flow rate of 6.5 mL/min (a water-flow linear flow velocity of 2 m/h and a space velocity of 20 $h^{-1}$), followed by regularly harvesting the water at the outlet, and measuring the strontium concentration in the simulated contaminated seawater by using Agilent 7700x ICP-MS manufactured by Agilent Technologies Inc. FIG. 2 shows strontium removal performance of Examples 1 to 3, Comparative Example 1, and Comparative Example 3. In FIG. 2, the horizontal axis is a B.V. (Bed Volume) representing, how much simulated contaminated seawater was flowed relative to the volume of the adsorbent, and the vertical axis is a value divided a strontium concentration of a column outlet by a strontium concentration of a column inlet. The definition of B.V. at breakthrough is the B.V. having $C/C_0$ greater than 5% from the onset of the water flow.

[Collapsed State of Particulate Alkaline Earth Metal Ion Adsorbent]

The collapsed state of the alkaline earth metal ion adsorbent was evaluated. The flowing-down state of an aqueous solution in the column test, and the state of the particulate alkaline earth metal ion adsorbent after the column test, and easiness of extraction from the column were determined as excellent, good, fair, or poor, as follows.

Excellent: the flowing-down of the aqueous solution in the column test has no difficulty, the particles are not collapsed after the column test, and the particles can be easily removed from the column.

Good: the flowing-down of the aqueous solution in the column test and the removal of the particles from the column It was found from Table 1 and FIG. 2 that in Examples 1 to 5, the B.V. until strontium is detected is higher than Comparative Examples 1 and 3 and have high strontium adsorption performance. In Comparative Example 2, the particles were collapsed in the column and thus, the flowing-down of the aqueous solution became impossible and the B.V. at breakthrough was non-measurable.

What is claimed is:

1. A particulate alkaline earth metal ion adsorbent comprising:
   a potassium hydrogen dititanate hydrate represented by a chemical formula $K_{2-x}H_xO \cdot 2TiO_2 \cdot nH_2O$, wherein x is 0.5 or more and 1.3 or less, and n is greater than 0; and
   no binder, wherein
   the particulate alkaline earth metal ion adsorbent has a particle size range of 150 μm or more and 1000 μm or less.

2. The particulate alkaline earth metal ion adsorbent according to claim 1, wherein in X-ray diffraction using a CuKα ray as an X-ray source, X-ray diffraction peak is within a range of 2θ of 8.5±2.0°.

3. The particulate alkaline earth metal ion adsorbent according to claim 1, wherein the particulate alkaline earth metal ion adsorbent exhibits a strontium adsorption performance having a B.V. of 3000 or more at breakthrough at which a ratio of a strontium concentration in water at an inlet ($C_0$) based on a strontium concentration in water at an outlet (C) is greater than 5%,
   when the particulate alkaline earth metal ion adsorbent is filled to a height of 10 cm in a cylindrical column having an inner diameter of 15.96 mm; and
   a simulated contaminated seawater comprising 0.3% of an ordinary salt, 5 ppm of strontium, 5 ppm of magnesium, and 1 ppm of cesium is flowed at a flow rate of 6.5 ml/min (a water-flow linear flow velocity of 2 m/h and a space velocity of 20 $h^{-1}$).

4. A production method of the particulate alkaline earth metal ion adsorbent according claim 1, comprising:

hydrating potassium dititanate represented by a chemical formula $K_2O \cdot 2TiO_2$, cation exchanging between a potassium ion ($K^+$) and a proton ($H^+$) to obtain a potassium hydrogen dititanate hydrate represented by a chemical formula $K_{2-x}H_xO \cdot 2TiO_2 \cdot nH_2O$, wherein x is 0.5 or more and 1.3 or less, and n is greater than 0, and granulating the hydrate without using a binder.

5. The production method according to claim 4, comprising the steps of:
 (1) mixing a titanium source and a potassium source;
 (2) calcining the resulting mixture to obtain potassium dititanate;
 (3) contacting potassium dititanate with water for hydration and cation exchange between the potassium ion and the proton to obtain a potassium hydrogen dititanate hydrate, $K_{2-x}H_xO \cdot 2TiO_2 \cdot nH_2O$, wherein x is 0.5 or more and 1.3 or less and n is greater than 0;
 (4) wet milling the resulting potassium hydrogen dititanate hydrate, $K_{2-x}H_xO \cdot 2TiO_2 \cdot nH_2O$, wherein x is 0.5 or more and 1.3 or less, in a slurry;
 (5) subjecting the slurry to solid-liquid separation to obtain a filter cake containing the potassium hydrogen dititanate hydrate;
 (6) granulating the filter cake into a particle of the potassium hydrogen dititanate hydrate without using the binder;
 (7) drying the potassium hydrogen dititanate hydrate at a temperature of 60° C. or more and 150° C. or less for 1 hour or more and 24 hours or less; and
 (8) disintegrating and sizing the dried potassium hydrogen dititanate hydrate to provide the particulate alkaline earth metal ion adsorbent having a particle size range of 150 μm or more and 1000 μm or less.

6. An alkaline earth metal ion-containing liquid treatment apparatus filled with the particulate alkaline earth metal ion adsorbent according to claim 1.

7. A radioactive strontium decontamination apparatus filled with the particulate alkaline earth metal ion adsorbent according to claim 1.

8. An alkaline earth metal ion-containing liquid treatment method, the method comprising using the particulate alkaline earth metal ion adsorbent according to claims 1.

9. A radioactive strontium decontamination method, the method comprising using the particulate alkaline earth metal ion adsorbent according to claim 1.

10. An alkaline earth metal ion-containing liquid treatment method comprising flowing an alkaline earth metal ion-containing liquid into an alkaline earth metal ion-containing liquid treatment apparatus filled with the particulate alkaline earth metal ion adsorbent according to claim 1 at a water-flow linear flow velocity (LV) of 1 m/h or more and 40 m/h or less and a space velocity (SV) of 5 $h^{-1}$ or more and 40 $h^{-1}$ or less.

11. A radioactive strontium decontamination method comprising flowing a radioactive strontium-containing liquid into a radioactive strontium decontamination apparatus filled with the particulate alkaline earth metal ion adsorbent according to claim 1 at a water-flow linear flow velocity (LV) of 1 m/h or more and 40 m/h or less and a space velocity (SV) of 5 $h^{-1}$ or more and 40 $h^{-1}$ or less.

* * * * *